Nov. 8, 1960 K. T. NYSTROM 2,959,455
AXLE STOP FOR JOURNAL BOXES
Filed Dec. 8, 1958
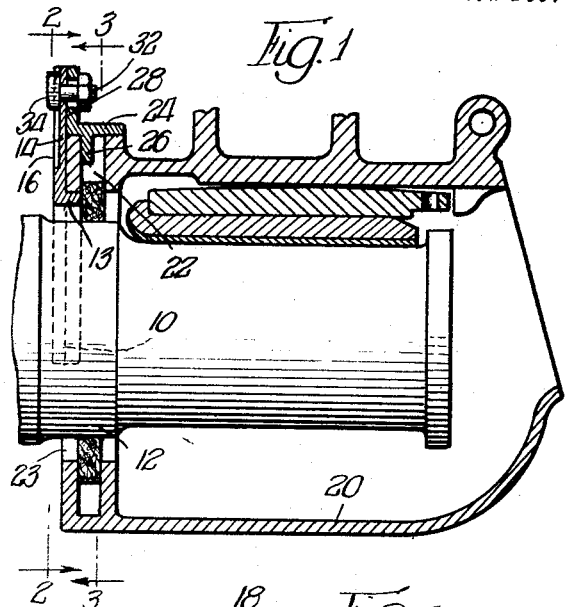
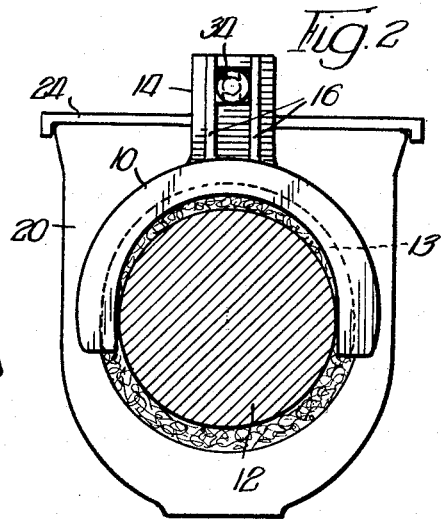
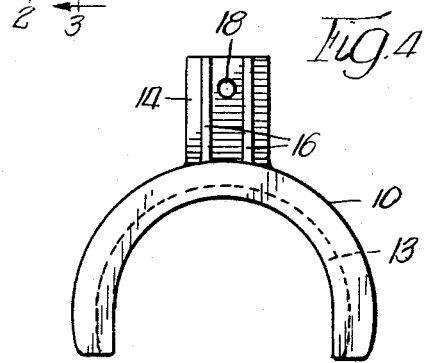
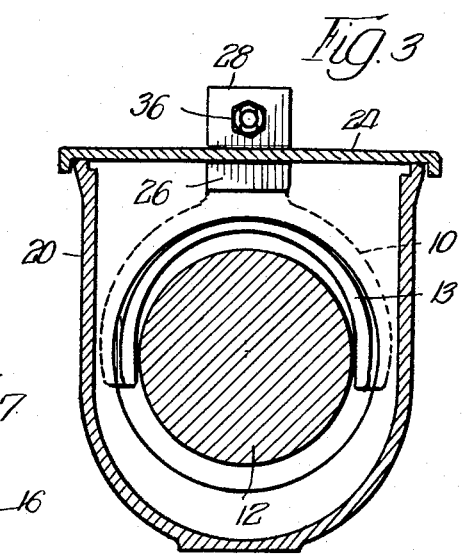
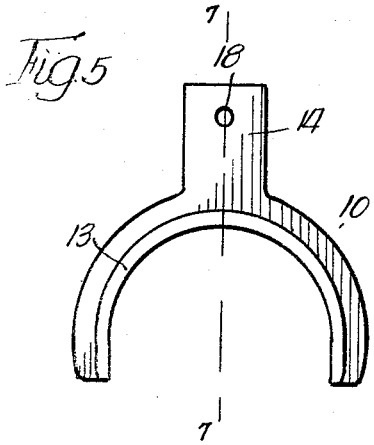
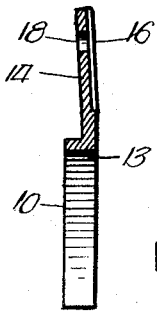
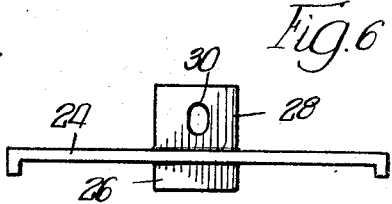
INVENTOR.
Karl T. Nystrom,
BY
Sabin C. Bronson.
Atty

United States Patent Office 2,959,455
Patented Nov. 8, 1960

2,959,455

AXLE STOP FOR JOURNAL BOXES

Karl T. Nystrom, % Beck & Blatchford, Inc., 713 Railway Exchange Bldg., 80 E. Jackson Blvd., Chicago 4, Ill.

Filed Dec. 8, 1958, Ser. No. 778,681

9 Claims. (Cl. 308—38)

This invention relates to railroad car journal boxes. More specifically the invention relates to a means for protecting the brass bearing and wedge assemblies upon an axle against displacement by heavy impacts due to switching, etc., by eliminating latitudinal movement of an axle within the box.

In standard A.A.R. practice, a wheel and axle assembly, having journals at the ends of the axle, support the weight of the car body through a truck side frame resting upon or being part of the journal box into which the axle journal extends. A brass bearing is applied over a limited portion of the journal, upon which is supported a wedge and the side frame and all superstructure of the car is supported thereon. This construction on occasion permits relative upward travel of the journal box. Due to the inertia effect upon sudden stopping of the car, the wheel and axle assemblies will come to a stop but the journal box and superstructure tend to move on, causing relative movement of the box about the axle resulting in displacement of the brass bearing and wedge.

A particular object of the invention, therefore, is to provide means which lends support to the car axle at each side for the purpose of preventing latitudinal movement thereof in relation to the box.

A further object of the invention is to provide a structure which is applicable to the present constructions of journal boxes now in operation so that none of the present side frames or car trucks need to be discarded, since the combination embodying my invention may be applied directly thereto, with no dismantling, fitting, or drilling of the box.

Another important advantage of my present invention is that it is applied to the rear of the box externally thereof, and is securely held to the box by the simple application of a single bolt and nut.

Other objects and advantages of the invention will appear in the following description thereof.

Referring now to the accompanying drawings forming part of this application and wherein like reference characters indicate like parts:

In the drawings:

Figure 1 is a longitudinal central sectional view through a railway car journal box showing the axle extending thereinto.

Figure 2 is a section through the axle at the wheel end of the box, looking toward the box.

Figure 3 is a section on the line 3—3 of Figure 1.

Figures 4 and 5 are side elevational views of opposite sides of the axle stop.

Figure 6 is a side elevational view of the top connection which fits over the top of the dust guard well in the journal box.

Figure 7 is a vertical section on the line 7—7 of Figure 5.

The device consists of a malleable iron hanger which is applied to the wheel face of the journal box. It is of U-shape, generally, and is applied as shown at the rear of the box with the open end down and partially surrounding the dust guard seat of an axle which projects within the box through a rear opening therein. The hanger part is held in place by the top connection which spans the upper open end of the dust guard well. The connection has a flange extending slightly within the well and another flange extending upwardly that has an opening therethrough. The hanger has a corresponding upwardly extending flange also with an opening therethrough, which openings, when the parts are assembled on the box, register with each other. The arcuate portion of the hanger has an arcuate flange extending within the opening at the rear of the box. When a bolt is applied through the registering openings and the nut pulled up tight, the axle stop is applied securely to the box.

In the drawings the hanger comprises a downwardly facing U-shaped portion indicated at 10 which is slightly more than one-half a circle and of a diameter to partially encircle the dust guard seat of the wheel axle 12, just outside of the box, with the lower portion of the arms of said U-shaped portion being positioned at opposite sides of said dust guard seat.

Projecting normally from the hanger is a U-shaped flange 13 which extends within the rear opening 23 of the journal box, fitting said opening rather snugly so that there is very little "play" between the two. The Brinell hardness of the hanger is controlled so that it is softer than the Brinell hardness of the axle, which contributes to the durability of the hanger and prevents practically all scoring of the axle. A flange 14 extends upwardly from the U-shaped portion of the hanger, and this flange is reinforced by a pair of spaced webs 16. Between webs 16 an opening 18 is formed.

The journal box itself is shown at 20, and this may be any standard A.A.R. journal box, having the usual dust guard well 22 adjacent the wheel end of the box and parallel therewith, and the rear opening 23 through which the axle journal may extend within the box.

The top connection of the device consists of a narrow, elongated, flat portion 24, which is of a length and width to fit over the dust guard well, resting across the top thereof. In effect it forms a cover therefor, eliminating the necessity of a well plug, as the connection effectively excludes dust and dirt from getting into the well. This connection 24 has a downwardly extending flange 26 which projects within the dust guard well when applied thereon, and an upwardly extending flange 28 which abuts flange 14. Flange 28 has an elongated opening 30 therein which registers with the opening 18. A bolt 32 is applied through said registering holes, the hole 30 providing for some adjustment which may or may not be necessary, and the square head 34 of the bolt just fits the space between the webs 16 which hold the bolt from turning. The nut 36 is a lock nut and when drawn up tightly, holds the parts securely together, making a fairly tight enclosure whereby the impact forces from the dust guard seat of the axle are transmitted by the hanger to the edge of the inboard dust guard well flange. Flange 13 holds the device from moving vertically in relation to the box, and the flange 26 holds the device from lateral movement, thereby always maintaining the ends of the U-shaped portion of the hanger at opposite sides of the dust guard seat of the axle, which is the essence of my invention.

As shown in Figure 7, the flange 14 extends upwardly from the U-shaped portion of the hanger at a slight angle from the plane thereof, so that when the bolt 32 is applied and nut 36 turned up tightly, the flange 14 will be sprung into place parallel with the flange 28.

The device is easily applied with no dismantling of the car truck whatsoever, since it is entirely outside of the box. The flange portion 13 which projects toward the dust guard well does not interfere with the application of the ordinary dust guard or seal. The entire device is held in position by one one-half inch bolt and one lock nut.

From the foregoing, it is apparent that I have provided an improved device which can withstand service impacts, with the result that movement of the axle within the journal box is greatly reduced if not practically limited, and which can accomplish its purpose without severe damage to itself or other car parts, and could conceivably reduce the lateral movement of the journal box on the axle as well as the longitudinal movement.

Having thus described my invention, what I claim and desire to secure by Letters Patent, is:

1. The combination with a journal box having a dust guard well at its inner end, and an opening, and an axle extending through said opening into the box, of a hanger comprising a portion partially encircling said axle, said hanger abutting the rear face of the box and having a portion extending within said opening, whereby the axle is prevented from movement independently transversely of the box, a top connection having a portion extending slightly within the dust guard well, and means securing said hanger and connection together.

2. The combination with a journal box having a dust guard well at its inner end, and an opening, and an axle extending through said opening into the box, of a hanger comprising a U-shaped portion partially encircling said axle, a U-shaped flange on said hanger extending within said opening, a top connection covering said dust guard well, a depending flange on said connection extending within said well, and means securing said hanger and connection together.

3. The combination with a journal box having a dust guard well at its inner end, and an opening, and an axle extending through said opening into the box, of a hanger having a portion partially encircling said axle, a flange extending normally from said hanger into said opening to prevent upward movement of said hanger, a top connection having a portion covering said dust guard well and a portion extending therewithin, and means securing said hanger and said connection together.

4. Means for preventing movement of an axle in a journal box, having a dust guard well and an axle opening, and an axle extending through said opening into said box, comprising a hanger having a semi-circular portion abutting the rear face of the box about the periphery of said opening and having means extending within said opening to prevent vertical movement of said hanger, and means attached to said hanger and having a flange extending in said dust guard well to prevent horizontal movement of said hanger, whereby said hanger will prevent independent lateral movement of an axle transversely with respect to said box.

5. A device for preventing independent lateral movement of an axle journal with respect to a journal box, said journal box having a rear wall with an axle opening therein, said device being applied to said box externally thereof and comprising a portion partially encircling said journal adjacent the rear face of said box, a laterally extending flange engaging an edge of said opening, and a second portion having a flange engaging a vertical face of said rear wall, whereby said device will prevent movement of said axle independently of said box.

6. The combination with a railway car journal box having a dust guard well and an opening through the rear wall of said box, a car axle extending through said opening into said box, of means for preventing independent movement of the journal within said box, said means comprising a U-shaped portion partially surrounding said axle abutting the rear face of said box externally thereof, a lateral flange issuing from the edge of said U-shaped portion and extending within said opening encircling the upper portion of said journal to prevent upward displacement of said means, and means to prevent lateral displacement of said first mentioned means.

7. The combination with a journal box, having an opening through its inner end, and a dust guard well, of a hanger, abutting the inner end of said box, a semi-circular flange issuing from said hanger and extending within said opening, a top connection having a portion covering the dust guard well, a flange issuing from said portion and extending within said dust guard well, and means connecting said hanger and said top connection together about a portion of the inner end of said box.

8. The combination with a journal box, having an opening at its inner end and a dust guard well, and an axle extending through said opening into said box, of means to prevent movement of said axle transversely with respect to said box, said means comprising a hanger having a semi-circular portion partially surrounding said axle externally of said box, a flange issuing from said semi-circular portion and extending into said opening between said axle and the edge of said opening, a top connection having a portion covering the dust guard well, a depending flange extending within said well, and means connecting the hanger and top connection together.

9. The combination with a journal box having a dust guard well at its inner end and an opening, and an axle extending through said opening into the box, of a hanger having a portion partially encircling said axle, a flange extending normally from said hanger into said opening to prevent upward movement of said hanger, a top connection having a portion covering said dust guard well and a portion engaging said rear wall, and means securing said hanger and said connection together.

References Cited in the file of this patent

UNITED STATES PATENTS 1,071,872  Brown _____ Sept. 2, 1913